United States Patent [19]

Hindersinn et al.

[11] 3,994,853

[45] *Nov. 30, 1976

[54] TACK FREE POLYMERIZABLE POLYESTER COMPOSITIONS

[75] Inventors: Raymond R. Hindersinn, Lewiston; Jeffrey E. Selley, East Amherst, both of N.Y.

[73] Assignee: Hooker Chemicals & Plastics Corporation, Niagara Falls, N.Y.

[*] Notice: The portion of the term of this patent subsequent to Sept. 30, 1992, has been disclaimed.

[22] Filed: June 27, 1975

[21] Appl. No.: 591,236

Related U.S. Application Data

[63] Continuation-in-part of Ser. No. 459,749, April 9, 1974, Pat. No. 3,909,483, which is a continuation-in-part of Ser. No. 260,937, June 8, 1972, abandoned.

[52] U.S. Cl. .............................. 260/40 R; 260/861
[51] Int. Cl.² ........................................ C08L 67/06
[58] Field of Search .................. 260/40 R, 861, 871

[56] References Cited

UNITED STATES PATENTS

| | | | |
|---|---|---|---|
| 3,275,709 | 9/1966 | Wooster et al. | 260/871 X |
| 3,535,404 | 10/1970 | Barie et al. | 260/871 |
| 3,909,483 | 9/1975 | Hindersinn et al. | 260/40 R |

*Primary Examiner*—Donald E. Czaja
*Assistant Examiner*—S. M. Person
*Attorney, Agent, or Firm*—Peter F. Casella; Howard M. Ellis

[57] ABSTRACT

Polymerizable polyester compositions containing a saturated polyester having three or more terminal carboxylic acid groups and an hydroxyl number of less than about 10 are provided. Such compositions are free from tackiness in the uncured state and which on curing are resistant to shrinkage and have improved surface smoothness. The compositions are useful as sheet molding compounds.

14 Claims, No Drawings

TACK FREE POLYMERIZABLE POLYESTER COMPOSITIONS

REFERENCE TO PRIOR APPLICATION

This is a continuation-in-part of copending application Ser. No. 459,749, filed Apr. 9, 1974, now U.S. Pat. No. 3,909,483, which is a continuation-in-part of copending application Ser. No. 260,937, filed June 8, 1972, now abandoned.

BACKGROUND OF THE INVENTION

The present invention relates to improvements in the art of preparing moldable reinforced polyesters characterized by being tack free and by little or no tendency towards shrinkage during the curing thereof, and to polyester compositions which when cured produce molded articles having superior surface smoothness; that is, "low profile", or little variation in surface smoothness. More particularly it relates to polymerizable polyester compositions comprising a compatible mixture of an $\alpha, \beta$-unsaturated polyester, an $\alpha, \beta$-ethylenically unsaturated monomer copolymerizable therewith, and a saturated polyester containing three or more terminal carboxylic acid groups, and having a hydroxyl number of less than about 10.

It has long been known to prepare linear polyesters by the reaction of dihydric alcohols and ethylenically unsaturated dicarboxylic acids, and that such unsaturated polyesters are capable of addition polymerization with unsaturated monomers to form thermoset polymers. These types of copolymers are widely disclosed in this art, for example, in U.S. Pat. No. 2,255,313 to Ellis, and others.

It is known also to admix such linear ethylenically unsaturated polyesters with ethylenically unsaturated monomers, such as styrene, and to heat the resulting mixture, in the presence of a catalyst, such as a free radical generating substance, to effect copolymerization. This type of reaction has been discussed in numerous patents including that of Ellis, mentioned above, and in the scientific literature e.g., Industrial and Engineering Chemistry, Dec. 1939, page 1512.

It has been suggested to add to the above mixture of unsaturated polyester and copolymerizable monomer, an unpolymerizable or saturated linear polyester which mixture can be polymerized or cured to a substantially infusible state and thereby to produce products of improved tensile and flexural strengths, see for example U.S. Pat. No. 2,856,378 to Lundberg.

Such polyester compositions are often reinforced with fillers such as fiber glass either in the form of rovings or mats and the molded products prepared therefrom have found extensive application in industry for example in floor panels for, or portions of, automotive bodies, for appliance shells, boat hulls and the like.

However, in the formation of shaped articles with such reinforced plastic composition, difficulties arise because the fibers initially immersed within the uncured liquid resin tend to protrude from the surface causing the object, after molding and curing of the resin, to have irregularities on the surface. Moreover, when the compositions gel to form thermoset cured compositions shrinkage occurs, and the cured piece often develops very small cracks or "microcracks". Such shrinkage, microcracks, and surface irregularities are particularly undesirable where a molded article having a very smooth surface is required. Shrinkage results in the separation of minute areas of the surface of the cured product from the mold surface, with the result that the surface exhibits minute irregularities or unevenness and is not of the desired smoothness. The molded article fails to accurately reproduce the dimensions and surface characteristics of the mold and results in either rejection of the piece or costly finishing operations, e.g., multiple sanding operations and the like. Such irregularities in surface smoothness is readily determined by a profile examination of the surface and hence molded articles having a truly smooth surface have been termed "low profile" moldings. Moreover, the polymerizable polyester mixture is difficult to handle, being sticky or tacky. Thus, when processed into preformed items such as prepregs, sheet molding compounds or extruded rods, the preformed items are difficult to handle and store due to the tacky nature of the materials.

Various attempts have been made to solve the problems referred to above. Thus the problems caused by separation of the reinforcing fibers from the uncured resin have been reduced by chemical thickening of the uncured resin by the addition of magnesium oxide (USP 2,628,209) or calcium or magnesium hydroxide, (U.S. Pat. No. 2,568,331 to Frelette and U.S. Pat. No. 3,431,320 to Baum et al).

Although attempts have been made to decrease the shrinkage which such polymerizable compositions undergo upon curing, for example by incorporating in such compositions thermoplastic additives such as poly(methyl methacrylate), poly(vinyl chloride), saturated polyesters having hydroxyl terminal groups and the like, such attempts have not been completely successful. Thus they have either failed to significantly reduce cure-shrinkage or they have imparted to the cured product undesirable physical properties as low hardness, low impact resistance, poor paint adhesion and the like.

Moreover such compositions as indicated above are unsatisfactory for use in the recently developed sheet molding compound technique of molding reinforced plastic materials. In this development, the curable mixture is compressed or preformed between sheets of polyolefin, e.g., polyethylene or polypropylene film, and film stripped from the preformed sheets of the curable polyester compositions just prior to molding. In many instances, the polyolefin film cannot be removed cleanly from the polyester resin sheet due to the tacky nature of the latter, resulting from the inclusion of the hydroxy terminated saturated polyesters. This is highly undesirable since it complicates the removal of the polyolefin film. Inasmuch as it is conventional in this art, to prepare the sheet and store or ship it before molding, this tacky or sticky condition is obviously undesirable.

Accordingly, it is a principal object of this invention to provide polyester compositions suitable for the preparation of low profile molded articles which in the precured state are not tacky.

Other objects and advantages of this invention will be apparent from the following description of the present invention.

SUMMARY OF THE INVENTION

In accordance with the present invention, it has been found that new curable or polymerizable polyester compositions are obtained by admixing components comprising:

1. a saturated polyester containing three or more terminal carboxylic acid groups and having a molecular weight of about 2,000 to about 25,000, and an acid number of from about 7 to about 170 and a hydroxyl number of less than about 10, such polyester generally being terminated with at least one moiety having at least two unreacted carboxylic acid groups;

2. an α, β-ethylenically unsaturated polyester of components comprising a diol and an α, β-ethylenically unsaturated dicarboxylic compound, and 3. an α, β-ethylenically unsaturated monomer copolymerizable with said unsaturated polyester, said composition comprising, at least about 5 parts by weight of said saturated polyester and at least about 30 parts by weight of said unsaturated polyester per 100 parts of the mixture of polyesters and monomer.

It has been found, further, that such curable mixtures can be preformed, i.e., sheet molding compounds can be prepared therefrom, which are substantially non tacky. Moreover, such compositions can be cured with little or no shrinkage upon curing. The curable polyester compositions can be cured in molds to provide molded articles having truly smooth surface characteristics free from microcracks and other surface imperfections.

DETAILED DESCRIPTION OF THE INVENTION

In accordance with the present invention polymerizable compositions are provided which compositions comprise:

1. a saturated polyester containing three or more terminal carboxylic acid groups and having a molecular weight of about 2,000 to about 25,000, an acid number of about 7 to about 170 and a hydroxyl number of less than about 10;

2. an α, β-ethylenically unsaturated polyester formed by reacting a diol with an α, β-ethylenically unsaturated dicarboxylic acid; and 3. an α, β-ethylenically unsaturated monomer, copolymerizable with said unsaturated polyester, preferably styrene. The saturated polyester is present in the amount of at least 5 parts by weight of said composition comprising the polyesters and monomer, preferably from about 10 to about 20 parts by weight. The unsaturated polyester is present in the amount of at least 30 parts by weight, preferably from about 30 to about 50 parts by weight, per 100 parts of the mixture of polyesters and copolymerizable monomer.

Preferably, and especially when the compositions of this invention are to be used for the preparation of sheet moldings compounds, an inorganic thickening agent is included. Such thickening agents are known in this art and typical agents include magnesium oxide, calcium oxide, calcium hydroxide, magnesium hydroxide, basic magnesium carbonate and mixtures thereof. Only relatively small amounts of these agents are used for example from about one half to about 15 parts by weight and preferably from 1 to about 7 parts by weight based on the weight of the mixture of polyesters and monomer. Greater or lesser amounts may be used depending upon the degree of thickening desired.

It is expecially desirable and hence preferred to select the polyesters, saturated and unsaturated- so that when admixed with the copolymerizable monomer, the resulting mixture is compatible, prior to curing. Thus, the mixture gives rise to a clear solution, but when cured, in the presence of a free radical catalyst, the cured product is an incompatible mixture, i.e., the cured product becomes opaque. It has been found that polymerizable mixture of such properties give rise to molded products of superior low profile characteristics.

The compositions of the invention can be mixed with fillers such as calcium carbonate, mold release agents, such as calcium or zinc stearate, free radical polymerization catalysts such as tert-butyl perbenzoate, and glass fibers. The mixture preferably is preformed by compressing between sheets of polyethylene film to prepare the sheet molding compounds. After a requisite period of aging at ambient temperature or above, the preformed sheet molding compound is removed and the polyethylene film can be cleanly stripped from the polymerizable mass.

Alternatively, the filled reinforced mixture can be molded directly in a suitable press as a "bulk molding compound". If desired, the molding composition can be extruded through a suitable die as a rod, the extruded rod may be cut into pellets or chips of a desired size and the pellets or chips transferred to a suitable molding press and heated therein under compression to cure the compositions.

As indicated above, when the polymerizable compositions are to be used to prepare sheet molding compounds or extrusions, it is preferred to incorporate into the polymerizable composition an inorganic thickening agent. In this manner, the sheet molding compounds and extrusions are obtained in a non-tacky condition, which permits the polyolefin film to be readily stripped from the compound and provides a non-tacky sheet with good integrity and in general simplifies the handling qualities of the preformed pieces.

The saturated polyesters having terminal carboxyl groups as used in the compositions of the present invention differ from the more conventional saturated polyesters of the prior art. The latter polyesters are generally prepared by reacting one molar equivalent of a dicarboxylic acid with one molar equivalent, or an excess, of a polyol. The condensation is continued until substantially complete reaction is obtained, as indicated by the acid number of the reaction mass, i.e., until an acid number within the range of about 5 to 40, depending on the desired molecular weight, is obtained, This reaction can be indicated by the following general equation:

(R and R' being organic residues of the dicarboxylic acid and polyol, or diol, in this instance, respectively, and n is the number of repetitive polyester units in the chain).

As above indicated, the conventional polyesters of the prior art contain essentially one terminal carboxyl group and one terminal hydroxyl group. As will be obvious to those skilled in this art, by using an excess of diol, the resultant polyester will contain essentially two terminal hydroxyl groups and substantially no terminal carboxyl groups.

The saturated polyesters containing terminal carboxyl groups are obtained by reacting a conventional polyester with sufficient additional polycarboxylic acid or anhydride which may be the same or different polycarboxylic acid used in the preparation of the conventional polyesters, to react with the terminal hydroxyl groups of the polyester. This reaction may be followed be determining the hydroxyl number of the reaction mass. Inasmuch as this reaction rarely goes to completion, it suffices for the purposes of this invention to carry the reaction to the point where the hydroxyl number of the polyester mass is below 10. The reaction may be illustrated by the following general equation:

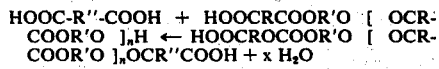

(R" being an organic residue, the same as or different than R').

As indicated the saturate polyester product is one in which the terminal groups are carboxyl groups, and which contains substantially no terminal hydroxyl groups, as indicated by the extremely low hydroxyl number, i.e., below about 10.

Accordingly, herein, the term "carboxyl group terminated saturated polyester" is intended to signify saturated polyesters the terminal groups of which are substantially all carboxylic acid groups, and substantially none of which terminal groups are hydroxyl groups. Such saturated polyesters have an average molecular weight of about 2000 to about 25,000, an acid number of about 7 to about 170 and a hydroxyl number of less than about 10.

The saturated polyesters having terminal carboxyl groups are prepared by first reacting substantially molar equivalent amounts of at least one polycarboxylic acid, with at least one polyol, preferably a diol, until the acid number of the reaction mass is about one or lower, and a hydroxyl number of about 20 to about 60. Thereafter the polyester product is reacted with a polycarboxylic acid or anhydride which may be the same or different as that used previously in sufficient amount to react with substantially all of the terminal hydroxyl groups in the original polyester. The latter reaction is carried out until the hydroxyl number of the reaction mass is less than about 10, preferably about 1 to about 3, and the acid number is within the range of about 7 to about 170.

As typical of the diols, aliphatic and aromatic, which can be used to prepare the saturated polyester component of the invention the following are mentioned by way of examples:
ethylene glycol
propanediol-1,2
propanediol-1,3
butanediol-1,4
hexanediol-1,6
diethylene glycol
dipropylene glycol and higher homologues thereof
neopentyl glycol
2,2,4-trimethylpentanediol
oxyalkylated bisphenols, such as oxyethylated bisphenol A
dimenthylol cyclohexane The diols generally have 2 to about 25 carbon atoms, preferably 2 to about 8 carbon atoms. Mixtures of these and equivalent diols are contemplated also. Further a diol as exemplified above in admixture with minor amounts, less than about 20 percent by weight of a polyol, such as glycerin, trimethylolpropane, pentaerythritol and the like, can be used also.

The dicarboxylic acids or anhydrides suitable for the preparation of the saturated component of the composition of this invention include the following by way of illustration.

oxalic acid
succinic acid
glutaric acid
adipic acid
pimelic acid
suberic acid
azelaic acid
sebacic acid
o-phthalic acid
isophthalic acid
terephthalic acid
tetrahydrophthalic acid
hexahydrophthalic acid
tetrachlorophthalic acid
tetrabromophthalic acid
endomethylene tetrahydrophthalic acid ("Nadic Acid")
methyl endomethyl tetrahydrophthalic acid ("Methyl Nadic Acid")
hexachloroendomethylene tetrahydrophthalic acid, also known as "chlorendic acid" and similar compounds disclosed in U.S. Pat. No. 2,779,701, which is incorporated herein by reference.

The corresponding anhydrides, acid halides or acid esters of the foregoing acids can also be used, e.g., isophthaloyl chloride, terephthaloyl chloride, dimethyl glutarate, dimethyl adipate, dimethyl terephthalate and the like, to form the same compositions.

In the preferred method of the invention, the initially prepared saturated polyester is reacted with a carboxylic compound having at least 3 and up to 6 carboxyl groups per molecule. Such polycarboxylic compounds can be used in admixture with dicarboxylic compounds provided that at least 10 parts by weight per 100 parts by weight of the mixture has 3 or more carboxyl groups per molecule. Typical polycarboxylic compounds include the following by way of illustration.

1,2,4-benzene tricarboxylic anhydride ("Trimellitic Acid")
1,2,4,5-benzene tetracarboxylic anhydride ("Pyromellitic Acid")
3,4,3',4'-diphenylmethane tetracarboxylic dianhydride
3,4,3'4'-benzhydrol tetracarboxylic dianhydride
3,4,3'4'-benzhydrol tetracarboxylic dianhydride methyl ether
3,4,3'4'-benzhydrol tetracarboxylic dianhydride acetate
3,4,3'4'-benzhydrol tetracarboxylic dianhydride propionate
2,3,3'4'-benzhydrol tetracarboxylic dianhydride butylate
3,4,3'4'-benzophenone tetracarboxylic dianhydride cyclopentane dianhydride
2,3,6,7-napthalenetetracarboxylic dianhydride
3,3',4,4'-diphenyltetracarboxylic dianhydride
1,2,5,6-napthalenetetracarboxylic dianhydride
2,2',3,3-biphenyltetracarboxylic dianhydride
2,3,4,5-thiophenetetracarboxylic dianhydride
2,2-bis(3,4-dicarboxyphenyl) propane dianhydride
bis(3,4-dicarboxyphenyl) sulfone dianhydride
3,4,9,10-perylenetetracarboxylic acid dianhydride
bis(3,4-dicarboxyphenyl) ether dianhydride Other typical polycarboxylic compounds are disclosed in U.S. Pat. No. 3,535,404 to Barie et al, which is incorporated herein by reference.

The unsaturated polyesters as contemplated for use in the compositions of this invention are well known in the art. As is known also such polyesters are derived by reaction of a diol, such as has been defined and illustrated hereinabove and an $\alpha, \beta$-ethylenically unsaturated dicarboxacid such as maleic acid, fumaric acid, itaconic acid, citraconic acid, mesaconic acid, aconitic acid, and the like. If desired, the unsaturated polymer can be prepared using the anhydrides, or acid halides, when available, of the above named dibasic acids, or mixtures of these acids and equivalent acids together with the same or different acid or anhydride. It is also contemplated to replace a portion of the unsaturated acid, or anhydride, with one or a mixture of saturated acids such as o-phthalic acid, isophthalic acid, tetrachlorophthalic acid, hexahydrophthalic acid, tetrabromophthalic acid, hexachloro-endomethylene-tetrahydrophthalic acid, the anhydrides of such acids if available, and the like. The use of halogenated dicarboxylic acids in this manner is especially desirable since the resultant products possess a high degree of fire retardancy.

The $\alpha, \beta$-ethylenically unsaturated monomer which is copolymerizable with the unsaturated polyester are known in this art and generally contain a $CH_2=C$ group. Illustrative of the suitable monomers are the following:
  styrene
  o-chlorostyrene
  vinyl toluene
  divinyl benzene
  diallyl phthalate
  diacetone acrylamide
  methyl methacrylate
  n-butylacrylate
  vinyl acetate
  vinyl propionate
  diallyl fumarate
and mixtures of these and equivalent monomers. Of these, styrene is generally to be preferred.

The amount of such monomer used is generally within the range of 10 to 65 percent and preferably within the range of about 20 to about 60 percent by weight of the mixture of polyesters and monomer.

The polyester compositions may contain, as a rule, known inhibitors to prevent premature polymerization, such as p-benzo-quinone,2,5-di-tert-butylquinone, hydroquinone, tert-butyl pyrocatechol, 4-ethyl-pyrocatechol, copper compounds, hydroxylamine derivatives, and the like.

The mixture of saturated and unsaturated polyesters and monomer may include a thickener, such as for example magnesium oxide, magnesium hydroxide, basic magnesium carbonate and calcium hydroxide. Calcium oxide can be used to replace a portion of the hydroxide and when used increases the effectiveness of the thickener, as disclosed in U.S. Pat. No. 3,431,320. The amount of thickener used is not critical and is generally in the range of about 0.5 to about 3 percent of the mixture of polyesters and monomer.

A free radical initiator is used to catalyze the copolymerization of the unsaturated polyester and unsaturated monomer. It is well known to use an organic peroxide to initiate the copolymerization and typical examples of such peroxides include tert-butylperbenzoate, benzoyl peroxide, methylethylketone peroxide, lauroyl peroxide, cumene peroxide and the like. Other free radical generating substances, such as 2,2'-azobisisobutyronitrile, can be used, such as disclosed in U.S. Pat. No. 2,255,313, which is incorporated herein by reference.

The polymerizable composition prepared in accordance with this invention contains additional components which are geneally conventional in the art of reinforced plastics. Thus fillers such as hydrated aluminum oxide, talcum, clays, chalk, asbestos powder and fibers, quartz powder, kieselguhr and the like, mold lubricants or mold release agents such as calcium and zinc stearate, silicones, and the like, reinforcing materials such as glass fibers, threads and mats, metal fibers, and the like and various mixtures thereof are incorporated by known means in the mixture.

Thus the mixture of unsaturated polyester, saturated polyester, copolymerizable monomer, thickening agent, filler, mold lubricant and catalyst is blended in suitable apparatus, such as a Cowles Dispersator. The resultant liquid mixture is applied by means of a doctor blade to two sheets of polyethylene film and the glass fibers are uniformly deposited on the resin mixture of one of the films and covered with the resin coated side of the other film. After covering the mass, the polyethylene film sandwich is squeezed between corrugated rolls so as to wet the glass fibers with the resin mixture followed by squeezing between smooth rolls. The resultant composition is then rolled on a fiber board core and sealed with aluminum foil backed cellophane film to prevent loss by evaporation of the monomer. After aging for a sufficient period, e.g., about two or more days at ambient temperature or above, to permit thickening of the mass, the resulting sheet molding compound can be cut into pieces of desired size, the polyethylene film peeled off and molded in a compression press in a known manner.

Suprisingly, it was found that when the saturated polyester components used in this manner were essentially carboxy group terminated saturated polyesters the polyethylene film could be cleanly peeled off of the sheet molding compound, i.e., the compound was not tacky or sticky. In contrast thereto, sheet molding compounds prepared using polyesters containing terminal hydroxyl groups were tacky or sticky, of poor integrity, and the polyethylene film could not be cleanly peeled from the compound.

The improvements in the preparation of the sheet molding compounds and in the low profile molded products prepared therefrom result from the use of the carboxyl group terminated saturated polyesters in conjunction with the thickening agent. As above indicated, it has been found that the polymerizable composition comprising:
  a. a saturated polyester containing three or more terminal carboxyl groups;
  b. an $\alpha, \beta$-unsaturated polyester;
  c. an $\alpha, \beta$-ethylenically unsaturated monomer copolymerizable with said unsaturated polyester, and
  d. a thickening agent, provides filled sheet molding compounds or bulk molding compounds which are non-tacky in character.

It has further been found that low profile molded articles can be obtained from such sheet molding compounds or directly from the polymerizable compositions of this invention by selecting the polyesters such that the mixture of polyesters and copolymerizable monomer is a compatible mixture prior to curing but upon being cured, i.e., copolymerized in the presence of a free radical initiator, results in an opaque resin product. Such polymerizable compositions result from the admixture of at least 5 parts by weight of said saturated polyester with at least about 30 parts by weight of said unsaturated polyester and about 20 to about 60 parts by weight of said copolymerizable monomer. (All ranges noted herein are based on 100 parts of the mixture of polyesters with copolymerizable monomer.)

Polyester compositions prepared in accordance of the present invention provide not only non-tacky sheet molding articles and bulk molding compounds but also molded articles which exhibit superior surface smoothness, gloss, substantial freedom from microcracks and internal fissures, improved hardness, extremely low shrinkage and exceptional low profile molded articles.

Examples I through IV illustrate the post-reaction of a diol terminated with various polyfunctional acid anhydrides.

EXAMPE I

A 1 liter resin kettle fitted with stirrer, thermometer and nitrogen purge was charged with 560 grams (approximately 0.1 mole) of a saturated polyester prepared from 0.64 mole of ethylene glycol, 0.43 mole of 1.4 butane diol, and 1.0 mole of adipic acid with an acid number of 0.2 and a hydroxyl number of 20.7. The flask was heated to 80° Centigrade in an oil bath at which time 38.4 grams (0.2 mole) of 1,2,4-benzene tricarboxylic anhydride was added and the composition heated at 120° Centigrade for 11 hours. Final acid number was 40.1.

EXAMPLE II

The procedure of Example I was repeated with 560 grams of saturated polyester treated with 43.6 grams (0.2 mole) of 1,2,4,5-benzene tetracarboxylic anhydride to give a final composition with an acid number of 50.

EXAMPLE III

The procedure of Example I was repeated with 560 grams of saturated polyester heated at 120° Centigrade with 10.0 grams (0.1 mole) of succinic anhydride and 21,8 grams (0.1 mole) of 1,2,4,5-benzenetetracarboxylic anhydride to an acid number of 36.4.

EXAMPLE IV

The procedure of Example III was repeated with 19.2 grams (0.1 mole) of 1,2,4-benzene tricarboxylic anhydride and 10.0 grams (0.1 mole) of succinic anhydride to an acid number of 34.6.

In Examples V through VII, as well as the above specification and appended claims, all parts and percentages are by weight unless otherwise specified. In these examples, surface smoothness was determined using a Bendex Microcorder and hardness was determined using the Barcol Hardness Tester.

EXAMPLE V

Preparation of Bulk Molding Compound and Molded Products Therefrom Using 1,2,4-Benzene Tricarboxylic Anhydride A mixture of 101.3 parts polypropylene fumarate (10 mole % phthalate), 27.8 parts of the composition of Example I, 55 parts styrene, 1.85 parts of magnesium hydroxide, 369 parts of calcium carbonate, and 141 parts of 1/4 inch chopped glass fibers was compounded on a sigma blade mixer, and when thoroughly mixed, rolled out between polyethylene film in a sheet between steel rollers. After 24 hours maturation, the film was peeled off. The formulations were found to be essentially tack-free.

The bulk molding compound was charged to an 8 inch by 8 inch mold containing a ⅜ inch and a ⅛ inch rib running along opposite sides. The mass was compression molded for two minutes at 149° Centigrade at 1000 p.s.i.

The resultant molded piece had the following properties:

| Shrinkage Profile | | |
|---|---|---|
| | Side to Side | −0.38 mils/inch (expansion) |
| | Center | 210 micro inches/½ inch |
| | Over ⅜ inch rib | 175 micro inches/½ inch |

EXAMPLE VI

Preparation of Bulk Molding Compound and Molding Products Therefrom Using Succinic Acid and 1,2,4,5-Benzene Tetracarboxylic Anhydride.

The procedure of Example V was repeated except that the composition of Example III was substituted for the composition of Example I. The resulting formulations were found to be essentially tack-free.

The resultant molded piece had the following properties:

| Shrinkage Profile | | |
|---|---|---|
| | Side to Side | −0.50 mils/inch (expansion) |
| | Center | 90 micro inches/½ inch |
| | Over ⅜ inch rib | 150 micro inches/½ inch |

The molded parts in Examples V and VI were found to have smooth surfaces with good glass and no sink marks.

EXAMPLE VII

Measurement of Thickening Rate of Bulk Molding Compound Filled Pastes

A mixture of 44 polypropylene fumarate (10 mole % phthalate), 12 parts low profile additive, and 24 parts styrene was charged with 160 parts calcium carbonate, 2.4 parts zinc stearate, and 1.2 parts magnesium hydroxide in a 6 oz. tall form jar, while mixing at medium high speed on a drill press with a 4 bladed stirrer. The jar was placed in a thermostatically controlled oven at 38° Centigrade. Viscosities of these filled pastes were measured at predetermined intervals to give a measure of thickening rate. The results for several low profile additive compositions and magnesium hydroxide concentrations are tabulated below.

| | VISCOSITY (CPS) AFTER 24 HOURS | | |
|---|---|---|---|
| | Magnesium Hydroxide Concentration | | |
| End Group Reactant in Low Profile Additive | 0.5% | 1.0% | 1.5% |
| 1,2,4-Benzene Tricarboxylic Anhydride | 140,000 | 3,500,000 | 27,000,000 |

-continued

| VISCOSITY (CPS) AFTER 24 HOURS | | | |
|---|---|---|---|
| | Magnesium Hydroxide Concentration | | |
| 1,2,4,5-Benzene Tetracarboxylic Anhydride | 5,500,000 | 139,200,000 | 104,000,000 |
| 1:1 Succinic Acid/1,2,4,5-Benzene Tetracarboxylic Anhydride | 1,200,000 | 1,600,000 | 5,700,000 |

While this invention has been described with respect to certain embodiments, these are not intended to limit the scope of the invention, but rather to illustrate the invention.

What is claimed is:

1. A polymerizable polyester composition of components comprising:
   1. a saturated polyester containing three or more terminal carboxylic acid groups and having a molecular weight of about 2,000 to about 25,000, and an acid number of from about 7 to about 170 and a hydroxyl number of less than about 10, such polyester generally being terminated with at least one moiety having at least two unreacted carboxylic acid groups;
   2. an , β, -ethylenically unsaturated polyester of a diol and an α, β-ethylenically unsaturated dicarboxylic compound, and
   3. an α, β-ethylenically unsaturated monomer copolymerizable with said unsaturated polyester;
   said saturated polyester being present in the amount of at least about 5 parts by weight and said unsaturated polyester being present in the amount of at least about 30 parts by weight per 100 parts by weight of the mixture of polyesters and copolymerizable monomer.

2. The composition of claim 1 wherein the copolymerizable monomer is present in the amount of about 20 to about 60 parts by weight per 100 parts by weight of the mixture of polyesters and copolymerizable monomer.

3. The composition of claim 1 wherein the composition also comprises an inorganic thickening agent.

4. The composition of claim 3 wherein the inorganic thickener is selected from the group consisting of magnesium oxide, magnesium hydroxide, basic magnesium carbonate, calcium hydroxide, and mixtures thereof.

5. The composition of claim 1 wherein the saturated polyester is obtained by reacting initially a diol with a dicarboxylic acid, anhydride, acid halide or diester to form a polyester having at least one terminal hydroxyl group and subsequently reacting the initially prepared polyester with a polycarboxylic acid or anhydride having at least three carboxy groups to prepare a carboxyl terminated saturated polyester.

6. The composition of claim 5 wherein the polyester initially formed is the product of reaction of a mixture of ethylene glycol and 1,4-butane diol with adipic acid, which polyester is subsequently reacted with 1,2,4-benzene tricarboxylic anhydride.

7. The composition of claim 5 wherein the polyester initially formed is the product of reaction of a mixture of ethylene glycol and 1,4-butane diol with adipic acid, which polyester is subsequently reacted with 1,2,4,5-benzene tetracarboxylic anhydride.

8. The composition of claim 1 wherein the saturated polyester is obtained by reacting initially a diol with a dicarboxylic acid or anhydride to form a polyester having at least one terminal hydroxyl group and subsequently reacting the initially prepared polyester with a mixture of a polycarboxylic acid having at least three carboxy groups and a dicarboxylic acid to prepare a carboxy terminated saturated polyester.

9. The composition of claim 8 wherein the polyester initially formed is the product of reaction of a mixture of ethylene glycol and 1,4 butane diol with adipic acid, which polyester is subsequently reacted with a mixture of 1,2,4,5-benzene tetracarboxylic anhydride and succinic adhydride wherein the 1,2,4,5-benzene tetracarboxylic anhydride is present in the amount of at least about 10 parts by weight per 100 parts by weight of the mixture of 1,2,4,5-benzene tetracarboxylic anhydride and succinic anhydride.

10. The composition of claim 9 wherein the 1,2,4,5-benzene tetracarboxylic anhydride and succinic anhydride are present in approximately equimolar amounts.

11. The composition of claim 9 wherein the polyester initially formed is the product of reaction of a mixture of ethylene glycol and 1,4-butane diol with adipic acid, which polyester is subsequently reacted with a mixture of 1,2,4-benzene tricarboxylic anhydride and succinic anhydride wherein the 1,2,4-benzene tricarboxylic anhydride is present in the amount of at least about 10 parts by weight per 100 parts by weight of the mixture of 1,2,4-benzene tricarboxylic anhydride and succinic anhydride.

12. The composition of claim 11 wherein the 1,2,4-benzene tricarboxylic anhydride and succinic anhydride are present in approximately equimolar amounts.

13. A thickened non-tacky sheet molding compound comprising a polymerizable polyester composition as defined in claim 1, a filler, an inorganic thickening agent, a free radical generating catalyst, and reinforcing glass fibers.

14. A thickened non-tacky sheet molding compound comprising a polymerizable polyester composition as defined in claim 1, a filler, a free radical generating catalyst, and reinforcing glass fibers.

* * * * *